United States Patent
Haneda et al.

(10) Patent No.: US 8,814,235 B2
(45) Date of Patent: Aug. 26, 2014

(54) SHOCK ABSORBER AND BUMPER DEVICE FOR VEHICLE

(75) Inventors: Shinichi Haneda, Anjo (JP); Kiyoichi Kita, Okazaki (JP); Kyousuke Matsui, Chiryu (JP); Tamaki Obayashi, Toyama (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 13/509,632

(22) PCT Filed: Nov. 11, 2010

(86) PCT No.: PCT/JP2010/070100
§ 371 (c)(1),
(2), (4) Date: May 14, 2012

(87) PCT Pub. No.: WO2011/059024
PCT Pub. Date: May 19, 2011

(65) Prior Publication Data
US 2013/0001963 A1    Jan. 3, 2013

(30) Foreign Application Priority Data

Nov. 16, 2009  (JP) .................................. 2009-261298

(51) Int. Cl.
*B60R 19/34*    (2006.01)
(52) U.S. Cl.
USPC ........................................................ 293/133
(58) Field of Classification Search
USPC .......... 293/133, 134, 102, 132, 122; 267/139, 267/220; 188/371, 377, 376; 138/371, 377, 138/376

See application file for complete search history.

(56) References Cited

U.S. PATENT DOCUMENTS

| 3,511,345 A * | 5/1970 | Motoo et al. .................. 188/371 |
| 3,599,757 A * | 8/1971 | Takamatsu et al. ........... 188/371 |
| 6,189,941 B1 * | 2/2001 | Nohr ............................. 293/118 |

(Continued)

FOREIGN PATENT DOCUMENTS

| JP | 47-008017 | 3/1972 |
| JP | 47-45986 | 11/1972 |

(Continued)

OTHER PUBLICATIONS

International Search Report in International Application No. PCT/JP2010/070100; Mailing Date: Jan. 11, 2011.

(Continued)

*Primary Examiner* — Kiran B Patel
(74) *Attorney, Agent, or Firm* — Finnegan, Henderson, Farabow, Garrett & Dunner, LLP

(57) ABSTRACT

A shock absorber includes a cylindrical small diameter portion, a cylindrical large diameter portion, and an annular step portion that connects the small diameter portion and the large diameter portion to each other. The shock absorber absorbs load applied thereto through plastic deformation that starts at the annular step portion thereby absorbing impact energy. In the deformation, the small diameter portion is folded back into the large diameter portion. The large diameter portion has protrusions, which extend in the axial direction and protrude radially outward. Therefore, the shock absorber stabilizes turning deformation and is capable of efficiently absorbing impact energy. A bumper device for a vehicle is also provided.

8 Claims, 3 Drawing Sheets

(56) References Cited

U.S. PATENT DOCUMENTS

| | | | | |
|---|---|---|---|---|
| 6,231,095 B1* | 5/2001 | Chou et al. | | 293/133 |
| 6,554,333 B2* | 4/2003 | Shimotsu et al. | | 293/132 |
| 6,648,384 B2* | 11/2003 | Nees et al. | | 293/132 |
| 6,702,345 B1* | 3/2004 | Yoshida | | 293/133 |
| 6,802,548 B2* | 10/2004 | Shimotsu | | 293/133 |
| 6,808,215 B2* | 10/2004 | Sakuma et al. | | 293/102 |
| 6,854,574 B2* | 2/2005 | Yoshida et al. | | 188/371 |
| 6,908,129 B2* | 6/2005 | Shimotsu | | 293/133 |
| 6,942,262 B2* | 9/2005 | Glasgow et al. | | 293/132 |
| 7,021,686 B2* | 4/2006 | Glasgow et al. | | 293/132 |
| 7,182,191 B2* | 2/2007 | Scott et al. | | 188/372 |
| 7,240,933 B2* | 7/2007 | Glasgow et al. | | 293/132 |
| 7,357,445 B2* | 4/2008 | Gross et al. | | 296/187.09 |
| 7,393,029 B2* | 7/2008 | Glasgow et al. | | 293/132 |
| 8,070,197 B2* | 12/2011 | Akgun et al. | | 293/133 |
| 8,123,263 B2* | 2/2012 | Evans | | 293/132 |
| 8,317,238 B2* | 11/2012 | Haneda et al. | | 293/117 |
| 2003/0209915 A1* | 11/2003 | Yoshida | | 293/133 |
| 2004/0155473 A1 | 8/2004 | Shimotsu | | |
| 2007/0236025 A1* | 10/2007 | Glasgow et al. | | 293/133 |
| 2007/0257497 A1* | 11/2007 | Heatherington et al. | | 293/120 |
| 2008/0201077 A1* | 8/2008 | Tanabe | | 701/301 |
| 2011/0233947 A1* | 9/2011 | Baccouche et al. | | 293/133 |
| 2012/0267908 A1* | 10/2012 | Kokubo et al. | | 293/133 |

FOREIGN PATENT DOCUMENTS

| | | |
|---|---|---|
| JP | 48-93045 | 12/1973 |
| JP | 2001-47952 | 2/2001 |
| JP | 2002-356134 | 10/2002 |
| JP | 2003-312400 | 11/2003 |
| JP | 2004-42883 | 2/2004 |
| JP | 2004-237889 | 8/2004 |
| JP | 2004-268621 | 9/2004 |
| JP | 2006-8088 | 1/2006 |
| JP | 2010-30529 | 2/2010 |

OTHER PUBLICATIONS

International Preliminary Report on Patentability for PCT/JP2010/070100 dated Jun. 12, 2012.

* cited by examiner

SHOCK ABSORBER AND BUMPER DEVICE FOR VEHICLE

CROSS-REFERENCE TO RELATED APPLICATIONS

This application is a national phase application of International Application No. PCT/JP2010/070100, filed Nov. 11, 2010, and claims the priority of Japanese Application No. 2009-261298, filed Nov. 16, 2009, the contents of both of which are incorporated herein by reference.

FIELD OF THE INVENTION

The present invention relates to a shock absorber and a bumper device for a vehicle.

BACKGROUND OF THE INVENTION

Conventionally, a shock absorber has been proposed that absorbs applied load through plastic deformation by being folded back in the axial direction thereby absorbing impact energy. Such axial folding deformation is known as turning deformation. For example, Patent Document 1 discloses a shock absorber including a metal pipe, in which a small diameter portion (2a) is continuous with a large diameter portion (2b) with a tapered portion (3) in between. The length of the large diameter portion (2b) is set to be substantially half the length of the small diameter portion (2a), and the small diameter portion (2a) is accommodated in the large diameter portion (2b) when the small diameter portion (2a) is subjected to turning deformation that starts at the tapered portion (3). This reduces the space behind the large diameter portion (2b) or the shock absorber that is required for allowing turning deformation.

PRIOR ART DOCUMENT

Patent Document

Patent Document 1: Japanese Laid-Open Patent Publication No. 2006-8088 (FIGS. 1 to 9)

SUMMARY OF THE INVENTION

For example, when load is applied to the shock absorber of Patent Document 1 in a direction inclined relative to the axial direction, the large diameter portion may be deformed. This can cause unstable turning deformation of the small diameter portion, making absorption of impact energy inefficient.

Accordingly, it is an objective of the present invention to provide a shock absorber and a bumper device for a vehicle that stabilize turning deformation and are capable of efficiently absorbing impact energy.

To achieve the foregoing objective and in accordance with a first aspect of the present invention a shock absorber is provided that includes a cylindrical small diameter portion, a cylindrical large diameter portion, and an annular step portion. The cylindrical large diameter portion has a protrusion. The protrusion extends in the axial direction and protrudes radially outward. The annular step portion connects the small diameter portion to the large diameter portion. The shock absorber absorbs load applied thereto through plastic deformation that starts at the annular step portion thereby absorbing impact energy, and the small diameter portion is folded back into the large diameter portion in the deformation.

According to this configuration, the protrusion formed on the large diameter portion increases the rigidity of the large diameter portion. Therefore, when the small diameter portion is folded back into the large diameter portion to absorb impact energy, the large diameter portion is prevented from being deformed. This stabilizes turning deformation of the small diameter portion, allowing the impact energy to be efficiently absorbed.

In accordance with one aspect, the annular step portion has a groove that extends over the entire circumference and is recessed in the axial direction toward the large diameter portion, and the groove promotes the plastic deformation of the small diameter portion.

According to this configuration, the groove of the annular step portion promotes turning deformation of the small diameter portion. This quickens the rise of the load to be absorbed by the turning deformation, allowing the impact energy to be further efficiently absorbed. Particularly, the turning deformation of the small diameter portion is stabilized when the small diameter portion receives a force component in a radial direction, for example, when the shock absorber receives a load in a direction inclined relative to its axis.

In accordance with another aspect, the shock absorber further includes a lid portion that is formed integrally with the small diameter portion. The lid portion closes an opening end at the distal end of the small diameter portion and is adapted to be attached to an object.

According to this configuration, a plate or a bracket for attaching does not need to be joined to the distal opening of the small diameter portion, for example, through welding when the small diameter portion of the shock absorber is attached to an object. This reduces the number of components.

In accordance with a further aspect the shock absorber is formed by deep drawing.

According to this configuration, the large diameter portion is made into an attachment portion to be attached to an object by leaving a part of a plate, which is a blank for the shock absorber, as a flange. Therefore, a plate (bracket) for attaching does not need to be joined to the opening end of the large diameter portion through, for example, welding. This reduces the number of components. Particularly, when combined with the above configuration with the groove, the groove can be formed in conjunction with the process of deep drawing using forming dies. Compared to a case in which the groove is formed in another independent process, the number of manufacturing steps is reduced. Alternatively, when combined with the above configuration with the lid portion, the lid portion can be formed in conjunction with the process of deep drawing using forming dies. Compared to a case in which the groove is formed in another independent process, the number of manufacturing steps is reduced.

In accordance with a second aspect, a bumper device for a vehicle that has the above described shock absorber is provided.

This configuration provides a bumper device for a vehicle with a crush box that stabilizes turning deformation and is capable of efficiently absorbing impact energy.

In accordance with another aspect, the bumper reinforcement includes a main wall and a pair of opposing walls.

The main wall is attached to the distal ends of the small diameter portions and extends in the width direction of the vehicle. The opposing walls are continuous with the upper and lower edges of the main wall, respectively, and extend in the vehicle front-rear direction and toward the large diameter portion. At the plastic deformation of the crush boxes, the opposing walls hold the large diameter portions in between.

According to this configuration, a pair of the opposing walls of the bumper reinforcement allow the length of the crush box to be extended, so that the bumper reinforcement can absorb a greater amount of impact energy. After a collision, the crush box is contained in the channel-like interior of the bumper reinforcement, so that the amount of deformation of the crush box is effectively utilized.

Effects of the Invention

The present invention provides a shock absorber and a bumper device for a vehicle that stabilize turning deformation and are capable of efficiently absorbing impact energy.

DETAILED DESCRIPTION OF THE PREFERRED EMBODIMENTS

One embodiment of the present invention will now be described with reference to drawings.

Figure 1:
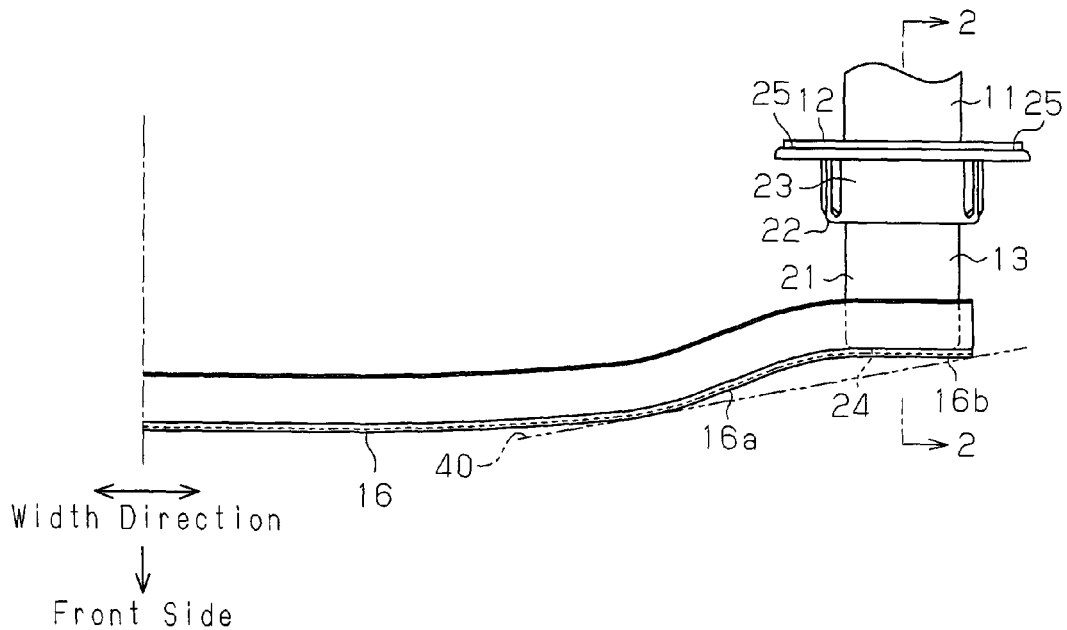
FIG. 1 is a plan view showing one embodiment of the present invention.
Figure 2:
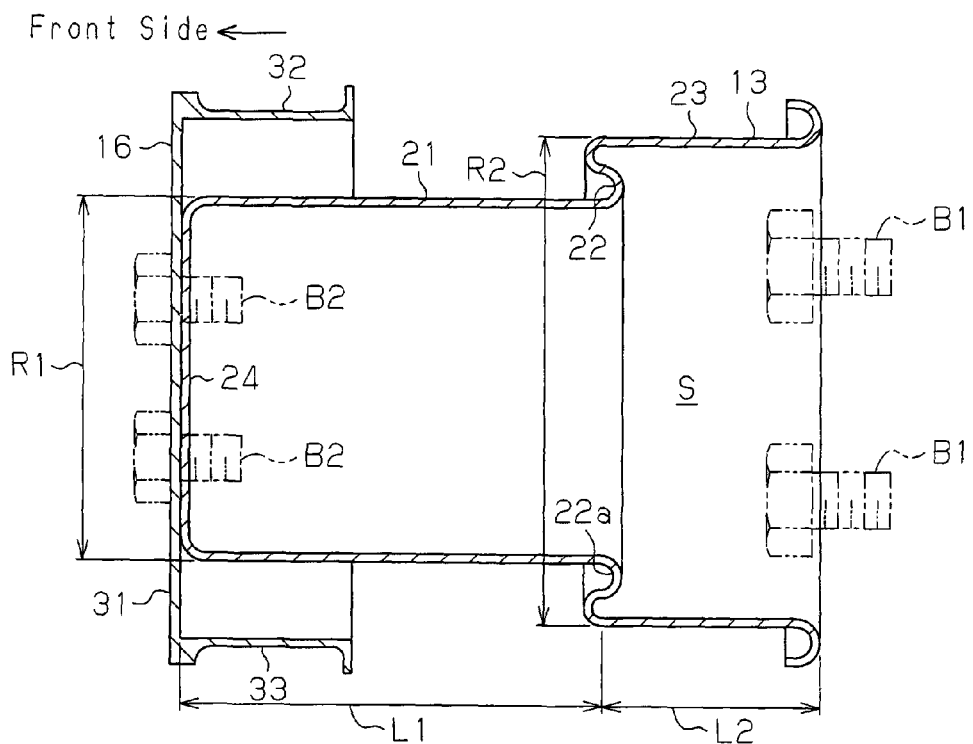
FIG. 2 is a cross-sectional view taken along line 2-2 of FIG. 1.

FIG. 1 is a plan view illustrating a vehicle bumper device according to the embodiment, and FIG. 2 is a cross-sectional view taken along line 2-2 in FIG. 1. The bumper device is applied to a front part of a vehicle such as an automobile. Since the vehicle bumper device has a symmetrical structure in the direction of width of the vehicle, the structure on one side (the structure of the right half as viewed toward the front of the vehicle) is omitted.

The vehicle includes a pair of side members 11, each of which is arranged on one side in the width direction of the vehicle and extends in the front-rear direction of the vehicle, as shown in FIG. 1. Each side member 11 has a hollow structure with a substantially rectangular cross-section and is formed, for example, by a metal plate. The side members 11 form a part of the vehicle body. A substantially rectangular bracket 12, which is made, for example, by a metal plate, is welded to the front end of each side member 11.

The vehicle bumper device includes crush boxes 13, which serve as shock absorbers. Each crush box 13 is made by deep drawing, for example, a metal plate (SPC270, SCGA270), extends in the front-rear direction of the vehicle, and is attached to the front side of the corresponding bracket 12. Each crush box 13 includes a cylindrical small diameter portion 21, a cylindrical large diameter portion 23, and a disk-shaped lid portion 24. The large diameter portion 23 is connected to the small diameter portion 21 via an annular step portion 22. The lid portion 24 is formed integrally with the small diameter portion 21 and closes the opening at the distal end of the small diameter portion 21. The center line in the vehicle front-rear direction is arranged to match with the center line of the side members 11 in the vehicle front-rear direction. The small diameter portion 21 and the large diameter portion 23 have an outer diameter R1 and an outer diameter R2 (R2>R1), respectively, and arranged coaxially. The axial length L1 of the small diameter portion 21 is set such that the half the length L1 (L1/2) is substantially equal to the axial length L2 of the large diameter portion 23 (L1/2≈L2). In the cross-sectional shape, the annular step portion 22 has a folded-back shape in the vehicle front-rear direction such that the radially inner portion protrudes further rearward than the radially outer portion. A groove 22a is formed in the radially inner portion. Specifically, the groove 22a extends over the entire circumferential dimension and is recessed axially toward the large diameter portion 23. The groove 22a promotes plastic deformation or turning deformation of the small diameter portion 21.

Plate-like attachment portions 25, the number of which is two in the present embodiment, are integrally formed with the rear end of the large diameter portion 23. The attachment portions 25 extend radially outward and are located at predetermined angular positions (two angular positions on the sides in the vehicle width direction). Each crush box 13 is fixed to the corresponding bracket 12 (the corresponding side member 11), together with the attachment portion 25, by threading nut to the threaded portions of bolts B1 inserted in the bracket 12. Attachment holes 24a, the number of which is four in the present embodiment, are formed in the lid portion 24. The attachment holes 24a are arranged symmetrically in the vertical and horizontal directions.

The vehicle bumper device includes a bumper reinforcement 16, which is formed, for example, of an extruded aluminum alloy. The bumper reinforcement 16 extends in the width direction of the vehicle and attached to the lid portions 24 of the crush boxes 13 at both ends in the vehicle width direction. The bumper reinforcement 16 has an elongated main wall 31, which extends in the vehicle width direction, and a pair of opposing walls 32, 33. The width in the vertical direction of the vehicle of the main wall 31 is larger than the outer diameter R2 of the large diameter portion 23. The opposing walls 32, 33 are continuous with the upper and lower edges of the main wall 31, respectively, and extend rearward, or toward the large diameter portion 23. That is, the bumper reinforcement 16 has a constant and channel-like cross section, which opens toward the crush boxes 13. As shown in FIG. 1, the bumper reinforcement 16 has at its either end an inclined portion 16a, which inclined rearward toward the outer end, and a distal portion 16b, which is located on the outer side of the inclined portion 16a. The distal portion 16b is located rearward from the center portion of the bumper reinforcement 16 in the vehicle width direction and extends in the vehicle width direction. That is, in a plan view, each end portion of the bumper reinforcement 16 has two bends that are angled in the opposite directions. Each distal portion 16b of the bumper reinforcement 16 contacts the corresponding lid portion 24 at a center of the main wall 31 in the vertical direction of the vehicle. The distal portion 16b, together with the main wall 31, is fixed to the lid portion 24 (the crush box 13) by threading nuts to the thread portions of bolts B2 extending through the lid portion 24 (that is, through the attachment holes 24a).

Figure 3:
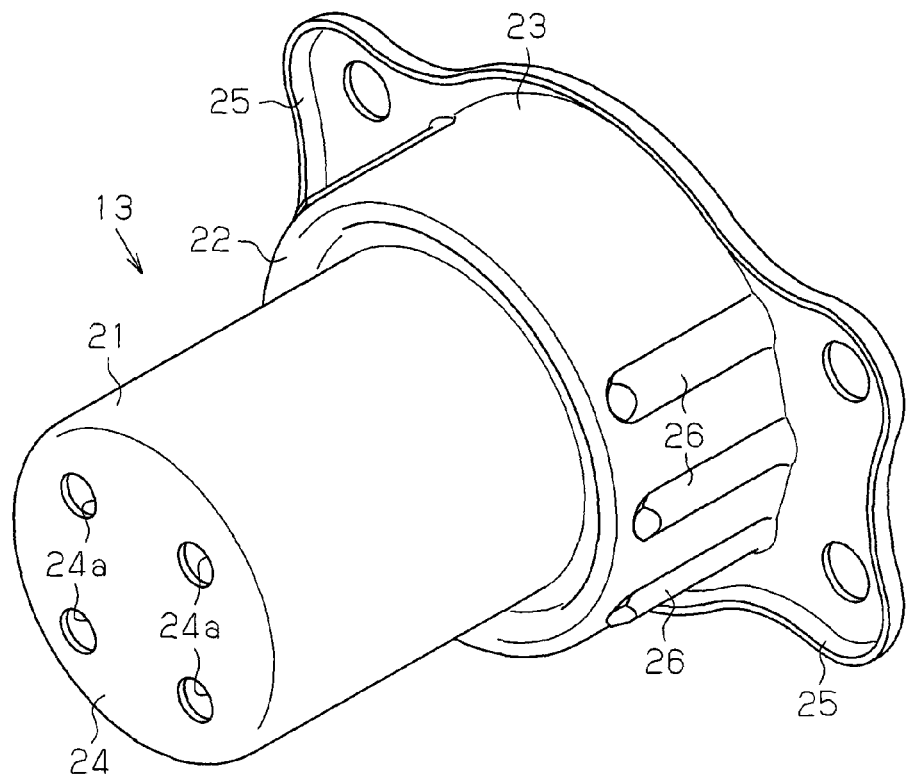
FIG. 3 is perspective view showing the embodiment of FIG. 1.

FIG. 3 is a perspective view illustrating the crush box 13. As shown in the drawing, protrusions 26 are formed on the large diameter portion 23 of the crush box 13. The protrusions 26 protrude radially outward and are located at angular positions that correspond to the sides in the vehicle width direction that correspond to the attachment portions 25. For example, three protrusions 26 are formed on either side, and a total of six protrusions 26 is formed on the large diameter portion 23. The protrusions 26 on either side are separated at equal angular intervals and extend substantially over the entire axial dimension of the large diameter portion 23. The protrusions 26 increase the rigidity of the large diameter portion 23 to prevent the large diameter portion 23 from being deformed when the small diameter portion 21 absorbs impact energy.

Operation of the present embodiment will now be described. When an impact applied from the front, for example, due to a collision with a vehicle, the impact is transmitted to the side members 11 (vehicle body) via the bumper reinforcement 16 and the crush boxes 13. At this time, the crush box 13 is plastically deformed together with the bumper reinforcement 16 to absorb the impact transmitted to the vehicle body and occupants.

Figure 4:
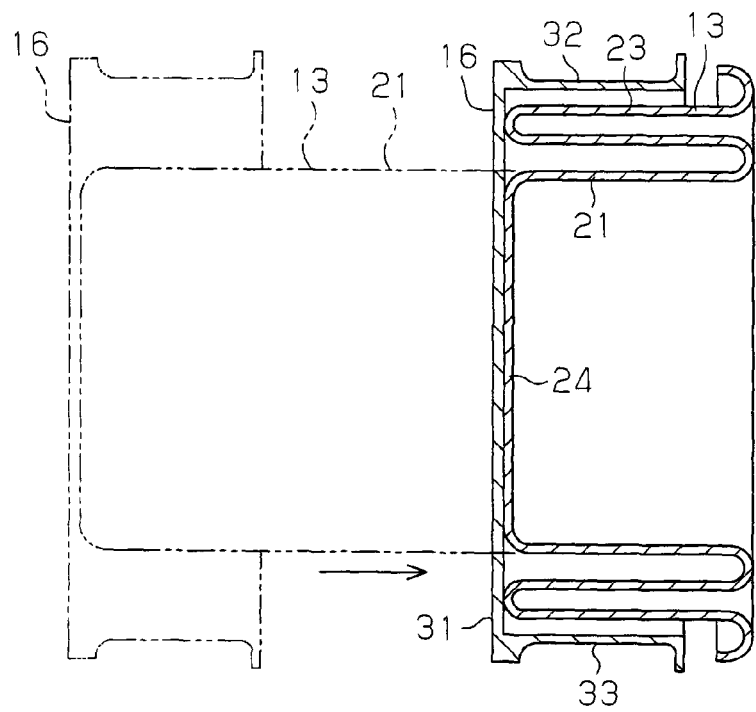
FIG. 4 is a cross-sectional view illustrating operation of the embodiment of FIG. 1.
Figure 5:
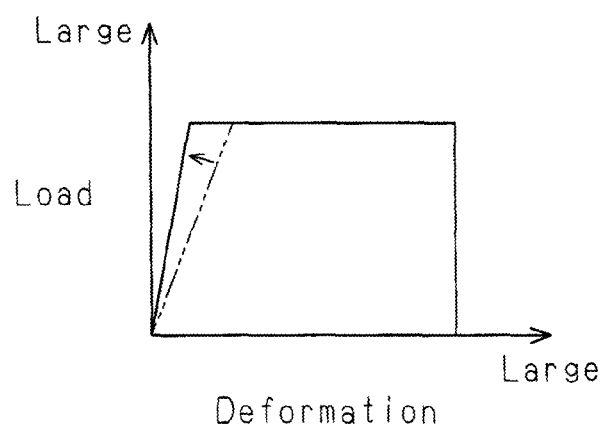
FIG. 5 is a graph showing the relationship between the amount of deformation and load.

That is, as shown in FIG. 4, each crush box 13 absorbs the applied load (axial compression load) through turning deformation that starts at the annular step portion 22 (the groove 22a), in which the small diameter portion 21 is folded back into the large diameter portion 23 thereby absorbing impact energy. That is, the annular step portion 22 forms a stress concentration portion, at which the turning deformation starts. Particularly, since the groove 22a promotes the turning deformation (plastic deformation) of the small diameter portion 21, the rise of the load to be absorbed by the turning deformation is quickened. FIG. 5 is a graph showing the changes of the load in relation to the amount of deformation (stroke) only of the crush box 13 when impact energy is absorbed. In the graph, the line formed by a long dash alternating with two short dashes corresponds to a case of a conventional crush box, which has the same structure as the present embodiment except that the groove 22a is omitted and a tapered annular step portion is provided instead. As shown in the graph, the rise of the load at the turning deformation is quicker in the crush box 13 of the present embodiment (solid line) than in the conventional crush box, and the impact energy is more efficiently absorbed.

The large diameter portion 23 has in it a space S for allowing the small diameter portion 21 to be folded back in the axial direction (see FIG. 2). Since the rigidity of the large diameter portion 23 is increased by the protrusions 26, deformation of the large diameter portion 23 is limited. This further stabilizes the turning deformation of the small diameter portion 21. When the small diameter portion 21 reaches the maximum turning deformation, the small diameter portion 21, the length of which has been halved by the deformation, is completely accommodated in the large diameter portion 23, the length of which is L2 (L1/2=L2).

Further, since the bumper reinforcement 16 has a pair of opposing walls 32, 33, the crush boxes 13 are allowed (ensured) to have an extended length, so that a greater amount of impact energy can be absorbed. After a collision, the crush box 13 is accommodated in the channel-like interior of the bumper reinforcement 16, so that the amount of deformation of the crush box 13 is effectively utilized. For example, when the crush box 13 starts plastic deformation and the opposing walls 32, 33 of the bumper reinforcement 16 start overlapping the large diameter portion 23 of the crush box 13, the opposing walls 32, 33 cover the top and bottom of the outer circumferential surface of the large diameter portion 23. In this state, the large diameter portion 23 is supported by the opposing walls 32, 33, which is expected to prevent the large diameter portion 23 from being bent.

Further, when an obstacle 40 collides in a slant direction with respect to the front-rear direction of the vehicle (refer to FIG. 1), a load is applied to the crush box 13 in a direction inclined relative to the axis of the crush box 13. In this case, a force component in a radial direction acts on the small diameter portion 21. Since the groove 22a promotes the turning deformation of the small diameter portion 21, the turning deformation of the small diameter portion 21 is stabilized. Particularly, the distal portions 16b are located rearward of the center portion in the vehicle width direction of the bumper reinforcement 16 due to the inclined portions 16a. Therefore, when the obstacle 40 collides with the bumper reinforcement 16 at two points as shown by the line formed by a long dash alternating with two short dashes with the inclined portion 16a in between (for example, when the obstacle 40 collides in an angle of 10° relative to the width dimension of the vehicle), a load is applied to both sides of the center in the vehicle width direction of the crush box 13. This cancels a part of the moment acting on the proximal end of the crush box 13. Accordingly, the crush box 13 is prevented from being bent laterally. The impact energy is therefore absorbed in a more stable manner.

A method for manufacturing the crush box 13 according to the present embodiment will now be described. As described above, the crush box 13 is made of a deep drawn metal plate. Through a series of pressing processes using various types of dies for deep drawing, a blank or a workpiece is obtained that substantially has a complete and integral outer shape with a small diameter portion 21, a large diameter portion 23 (protrusions 26), a lid portion 24, and an attachment portions 25. However, at this stage, only a tapered shape that is to be made into an annular step portion 22 is formed, due to the restriction accompanying the deep drawing. Then, subsequent pressing is performed using an annular die, which slides along the outer circumferential surface of the small diameter portion 21 toward the tapered shape, and an annular or columnar die, which slides along the inner circumferential surface of the large diameter portion 23, so that the annular step portion 22 and its groove 22a are formed. The crush box 13 is thus complete. Therefore, through a series of pressing steps of deep drawing and the closely related pressing step, the annular step portion 22 can be formed without increasing the number of manufacturing steps.

As described above, the present embodiment has the following advantages.

(1) Since protrusions 26 are formed on the large diameter portion 23, the rigidity of the large diameter portion 23 is increased. Therefore, when the small diameter portion 21 is folded back into the large diameter portion 23 to absorb impact energy, the large diameter portion 23 is prevented from being deformed. This stabilizes turning deformation of the small diameter portion 21, allowing the impact energy to be efficiently absorbed.

(2) The groove 22a of the annular step portion 22 promotes turning deformation (plastic deformation) of the small diameter portion 21. This quickens the rise of the load to be absorbed by the turning deformation, allowing the impact energy to be further efficiently absorbed. Particularly, the turning deformation of the small diameter portion 21 is stabilized when the small diameter portion 21 receives a force component in a radial direction, for example, when the crush box 13 receives a load in a direction inclined relative to its axis.

(3) The lid portion 24 is integrally formed with the crush box 13 (the small diameter portion 21). When attaching the crush box 13 to an object (the bumper reinforcement 16), a plate (bracket) for attaching does not need to be joined to the opening at the distal end of the small diameter portion 21 through, for example, welding. This reduces the number of the components.

(4) At the deep drawing of the crush box 13, the large diameter portion 23 can be made to have the attachment portions 25 to be attached to an object (the side member 11) by leaving a part of a plate, which is a blank, as a flange. A plate (bracket) for attaching does not need to be joined to the opening of the large diameter portion 23 through, for example, welding. This reduces the number of the components. Also, the groove 22a of the annular step portion 22 and the lid portion 24 are formed in conjunction with a series of the deep drawing procedure with dies. Therefore, compared to a case in which the groove 22a and the lid portion 24 are formed in other independent process, the number of manufacturing steps is reduced.

(5) A bumper device for a vehicle with a crush box 13 that stabilizes turning deformation and is capable of efficiently absorbing impact energy is provided.

(6) A pair of the opposing walls 32, 33 of the bumper reinforcement 16 allow the length of the crush box 13 to be extended, so that the bumper reinforcement 16 can absorb a greater amount of impact energy. After a collision, the crush box 13 is accommodated in the channel-like interior of the bumper reinforcement 16, so that the amount of deformation of the crush box 13 is effectively utilized.

(7) In a plan view, the bumper reinforcement 16 has two bends that are angled in the opposite directions at either end. This increases the bending strength.

The above described embodiment may be modified as follows.

In the above embodiment, the number and arrangement of the protrusions 26 of the crush box 13 (the large diameter portion 23) are only examples, and may be changed. For example, protrusions 26 may be arranged at intervals over the entire circumference of the large diameter portion 23 (for example, at equal angular intervals).

The cylindrical shape of the small diameter portion 21 and the large diameter portion 23 contain a cylindrical shape having a flattened part, for example, an elliptic cylinder and a flattened cylinder.

The crush box 13 may be formed of pressed iron, a rolled material, or extrusion of light metal such as an aluminum alloy.

Instead of or in addition to supporting the crush box 13, which is plastically deformable, from the top and bottom by the opposing walls 32, 33, the crush box 13 may be supported on the left and right sides, for example, by opposing walls, which are arranged in the width direction of the vehicle.

The bumper reinforcement 16 may be formed of pressed iron or a rolled material.

The shock absorber according to the present invention may be applied to any frames for shock absorbing other than crush boxes. For example, the shock absorber may be applied to the side members 11.

The shock absorber and the vehicle bumper device of the present invention may be applied to the rear part of a vehicle.

The invention claimed is:

1. A bumper device for a vehicle, comprising:
a bumper reinforcement that extends in a direction of the width of a vehicle, the bumper reinforcement having two opposite ends;
a pair of side members that extend in a front-rear direction of the vehicle; and
a pair of crush boxes each located at one of the ends of the bumper reinforcement, wherein each crush box is located between the bumper reinforcement and the corresponding side member, and each crush box is a shock absorber and includes:
a cylindrical small diameter portion;
a cylindrical large diameter portion having a protrusion, wherein an attachment portion is integrally formed with the large diameter portion and extends radially outward and is fixed to the corresponding side member, the protrusion is integrally formed with the large diameter portion and continuously extends to the attachment portion in the axial direction and protrudes radially outward, and the attachment portion is arranged at an angular position that the protrusion extends; and
an annular step portion that connects the small diameter portion and the large diameter portion to each other, wherein the shock absorber absorbs load applied thereto through plastic deformation in which the small diameter portion is folded back into the large diameter portion and at the annular step portion as the starting point of the deformation, so that impact energy is absorbed.

2. The bumper device for a vehicle according to claim 1, wherein the annular step portion has a groove that extends over the entire circumference and is recessed in the axial direction toward the large diameter portion, the groove promoting the plastic deformation of the small diameter portion.

3. The bumper device for a vehicle according to claim 1, further comprising a lid portion that is formed integrally with each small diameter portion, wherein the lid portion closes an opening end at the distal end of the small diameter portion and is adapted to be attached to an object.

4. The bumper device for a vehicle according to claim 1, wherein the bumper device is formed by deep drawing.

5. The bumper device for a vehicle according to claim 1, wherein the bumper reinforcement includes:
a main wall that is attached to the distal ends of the small diameter portions and extends in the width direction of the vehicle; and
a pair of opposing walls, which are continuous with the upper and lower edges of the main wall, respectively, and extend in the vehicle front-rear direction and toward the large diameter portion, wherein, at the plastic deformation of the crush boxes, the opposing walls hold the large diameter portions in between.

6. The bumper device for a vehicle according to claim 1, wherein the protrusion is one of a plurality of protrusions, and the plurality of protrusions are circumferentially arranged on the large diameter portion.

7. The bumper device for a vehicle according to claim 1, wherein the protrusion is located at each of angular positions of the large diameter portion that correspond to the sides in the vehicle width direction, and the attachment portion is located at each of the angular positions of the large diameter portion that correspond to the sides in the vehicle width direction.

8. The bumper device for a vehicle according to claim 6, wherein the protrusion is located at each of angular positions of the large diameter portion that correspond to the sides in the vehicle width direction, and the attachment portion is located at each of the angular positions of the large diameter portion that correspond to the sides in the vehicle width direction.

* * * * *